United States Patent [19]

Motomura et al.

[11] Patent Number: 4,470,535
[45] Date of Patent: Sep. 11, 1984

[54] METHOD OF PROCESSING A FRONT COVER FOR A TORQUE CONVERTER

[75] Inventors: Jiro Motomura, Anjo; Seiichi Nishikawa, Toyokawa, both of Japan

[73] Assignee: Aisin Warner Kabushiki Kaisha, Aichi, Japan

[21] Appl. No.: 346,213

[22] Filed: Feb. 5, 1982

[30] Foreign Application Priority Data

Feb. 10, 1981 [JP] Japan .................................. 56-18302

[51] Int. Cl.³ ........................................... B23K 31/00
[52] U.S. Cl. ................................... 228/125; 228/162; 51/227 R; 51/125.5; 29/156.8 FC
[58] Field of Search ................... 72/340, 379; 29/156.8 FC, 557; 192/3.28, 3.29, 3.3, 3.31; 51/125, 125.5, 131.3, 131.4, 131.5, 227 R; 228/162, 161, 125

[56] References Cited

U.S. PATENT DOCUMENTS

| | | | |
|---|---|---|---|
| 881,646 | 3/1908 | Allen | 51/131.5 |
| 1,122,114 | 12/1914 | Hill | 51/227 R |
| 1,412,867 | 4/1922 | Hill | 51/131.5 |
| 1,572,451 | 2/1926 | Taylor | 51/131.5 |
| 1,607,292 | 11/1926 | Miller | 51/227 R |
| 2,378,243 | 6/1945 | Penberthy | 51/131.3 |
| 2,509,211 | 5/1950 | Clement | 51/227 R |
| 3,285,050 | 11/1966 | Cook | 72/379 |
| 3,355,840 | 12/1967 | Bonning | 51/125 |
| 4,202,431 | 5/1980 | Yamamori et al. | 192/3.3 |
| 4,240,532 | 12/1980 | Blomquist | 192/3.28 |
| 4,314,472 | 2/1982 | Saegusa et al. | 72/340 |

FOREIGN PATENT DOCUMENTS

| | | | |
|---|---|---|---|
| 260316 | 5/1963 | Australia | 51/125 |
| 2252503 | 5/1974 | Fed. Rep. of Germany | 51/131 D |
| 458384 | 7/1950 | Italy | 51/125 |

Primary Examiner—Daniel C. Crane
Attorney, Agent, or Firm—Koda and Androlia

[57] ABSTRACT

A method of grinding an annular surface into a flat annular surface, in which a front cover for a torque converter is formed by means of press-forming and the thus press-formed front cover is supported floatingly on a supporting table and pressed against an annular grinding stone to be ground.

3 Claims, 3 Drawing Figures

METHOD OF PROCESSING A FRONT COVER FOR A TORQUE CONVERTER

BACKGROUND OF THE INVENTION

A torque converter comprises a pump impeller, a turbine runner and a stator supported in a one-way clutch. The pump impeller is connected to the output shaft of an engine through a front cover concentrically affixed thereto. The turbine runner is connected to the input shaft of a transmission gear.

In an automatic transmission for a motor vehicle, a direct-coupling clutch is provided within the torque converter for directly connecting the output shaft of the engine and the input shaft of the transmission gear. For this purpose, a clutch disk is mounted axially slidably on the input shaft of the transmission gear and is adapted to be rotatable together with the turbine runner in the space formed between the front cover and the turbine runner, while a flat surface is formed on the front cover for affixing a frictional material or for frictionally engaging with a friction material affixed to the clutch disk. The output shaft of the engine and the input shaft of the transmission gear are directly connected by the frictional engagement of the clutch disk and the front cover through the frictional material.

It is necessary that a friction surface formed on the front cover for affixing a frictional material or for engaging with a frictional material is quite flat in order to provide the direct-coupling clutch with an increased capacity of torque transmission and to prevent the irregular wear of the frictional material.

However, since the front cover of the torque converter is manufactured by press-forming a metal plate in order to attain a high productivity as well as low manufacturing cost, the friction surface is subject to deflection and corrugation due to the spring-back phenomenon of the press-formed plate. Besides, the front plate is liable to be partially deformed during the welding of mounting seats and a center guide to the front cover.

In order to remove the irregularity originating in such deflection, corrugation and/or partial deformation, the friction surface is finished by grinding or cutting the irregularity by means of a grinding machine or a cutting machine as deep as to a surface lying at a predetermined distance from a zero-surface. Such a finishing process sometimes results in an excessively thin thickness of the front cover, which is liable to cause cracking of the front cover.

SUMMARY OF THE INVENTION

Generally speaking, in accordance with the present invention, a simple method of processing a front cover for a torque converter for finishing an annular friction surface formed on the inside surface of the front cover in a plane of a high flatness is provided.

The front cover is manufactured by a method comprising a step of forming from a metal plate by means of press-forming, a front cover of a drum shape comprising integrally a front wall portion having an annular friction surface, a cylindrical peripheral portion extending from the periphery of said front wall portion in a direction substantially perpendicular thereto, and a connecting portion having an arcuate section and connecting the front wall portion and the peripheral portion and a successive step of grinding the friction surface by supporting the press-formed front cover floatingly by means of a supporting device, then by pressing the grinding surface of a grinding stone formed in an annular shape the same with the final shape of the finished friction surface against the friction surface formed on the inside surface of the front cover under the relative rotation of the front cover and the grinding stone about the axis of the front cover.

Accordingly, it is an object of the present invention to provide a method of manufacturing, at a reduced cost, the front cover of a torque converter, which front cover has a flat friction surface suitable for constituting a direct-coupling clutch, through press-forming and simple grinding processes.

Another object of the present invention is to provide a method of finishing the friction surface of a press-formed front cover by floatingly supporting the front cover on a supporting device and grinding the friction surface into a highly flat friction surface without excessively grinding-off and reducing the thickness of the front cover.

Still other objects and advantages of the present invention will in part be obvious and will in part be apparent from the specification.

BRIEF DESCRIPTION OF THE DRAWINGS

For a fuller understanding of the present invention, reference is has to the following description taken in connection with the accompanying drawings, in which.

DESCRIPTION OF THE PREFERRED EMBODIMENTS

Figure 1:
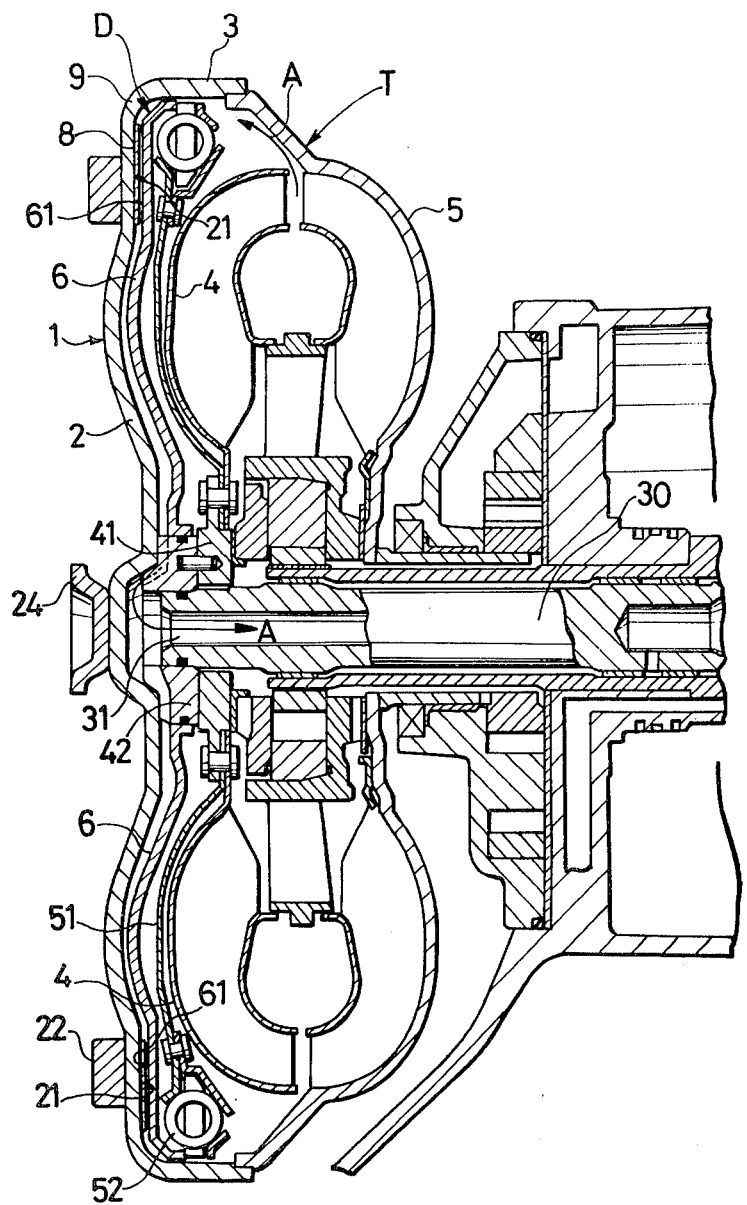
FIG. 1 is a sectional view of a torque converter equipped with a direct-coupling clutch.

FIG. 1 is a sectional view of a torque converter comprising a direct-coupling clutch and adapted to be incorporated into a vehicle automatic transmission. A torque converter and the front cover of the torque converter are generally indicated at a symbol T and a reference numeral 1 respectively. The front cover 1 is formed in a configuration of a drum comprising a front wall portion 2 of a disk-shape, a cylindrical peripheral portion 3 which is extending from the periphery of the front wall portion 2 substantially perpendicularly to the front wall portion 2 and a curved connecting portion 9 connecting the front wall portion 2 and the peripheral portion 3. A center guide 24 is welded to the front wall portion 2 at the central axis thereof. A plurality of mounting seats 22 are welded to the front wall portion 2 at the marginal portion thereof. The torque converter 1 is connected coaxially to the output shaft, not shown, of an engine by means of the mounting seats 22. The free end of the peripheral portion 3 is fixed to the flange of the pump impeller shell 5 of the torque converter T.

A direct-coupling clutch indicated generally at a symbol D is constructed in a space formed between the front cover 1 and a turbine runner 4. The turbine runner 4 of the touque converter T is mounted fixedly on an output shaft 30 by means of the hub 41. The clutch disk 6 of the direct-coupling clutch D is mounted axially slidably on a center ring 42 fixed coaxially to the hub 41 at the front thereof. The clutch disk 6 is connected at the periphery thereof to a cushion plate 51 connected to the hub 41 through a spring 52. Accordingly, the clutch disk 6 is rotated together with the turbine runner 4 and when pressurized fluid is supplied into the torque converter T through the space between the turbine runner 4 and the pump impeller shell 5 and through the space between the front cover 1 and the clutch disk 6, then into the central bore 31 formed on the output shaft 30 and discharged from a drain port, not shown, as shown by an arrow A, the clutch disk 6 is pressed against the front cover 1.

A flat annular surface 21 of a predetermined area is formed on the inside surface of the front wall portion 2 of the front cover 1 near the periphery of the front wall portion 2 is a plane perpendicular to the axis of the output shaft 30 of the torque converter T. The clutch disk 6 also has a flat annular surface 61 of a diameter the same with that of the flat annular surface 21 and of a predetermined area formed on the surface thereof opposite to the flat annular surface 21. A flat annular frictional material 8 of a high coefficient of friction is interposed between the surfaces 21 and 61. The frictional material functions as means to frictionally connect the front wall portion 2 of the front cover 1 and the clutch disk 6 when the clutch disk 6 is pressed toward the front cover 1. In the embodiment as shown in FIG. 1, the frictional material 8 is affixed to the surface 21 of the front wall portion 2 and the surface 61 of the clutch disk 6 engages frictionally with the frictional material 8, however, in a modification, the frictional material 8 may be affixed to the surface 61 of the clutch disk 6, while the surface 21 of the front wall portion 2 may be adapted to engage frictionally with the frictional material 8. The surfaces 21 and 61 will be designated as "friction surfaces" hereinafter.

It is preferable that the respective entire surface of the frictional material 8 and the friction surface 21 or the friction surface 61 are in contact when the frictional material 8 and the friction surface 21 or the friction surface 61 engage, therefore, a high flatness is required of the friction surfaces 21 and 61. Furthermore, in order to provide an increased capacity of torque transmission for the direct-coupling clutch, a largest possible outside diameter is required of the friction surfaces 21 and 61. Accordingly, in the front cover 1, a highest possible flatness and a largest possible outside diameter are required of the friction surface 21. However, since the front cover of this type is manufactured by press-forming due to the high productivity and the low manufacturing cost of the press-forming process, the friction surface is subject to deflection and/or corrugation resulting from the spring-back effect of the press-formed front cover. Furthermore, the welding of the mounting seats and the center guide is likely to cause irregularity in the friction surface 21 formed on the inside surface of the front cover 1. Therefore, it is necessary to finish the friction surface 21 formed on the inside surface of the press-formed front cover 1 by machining in a flat surface.

Figure 2:
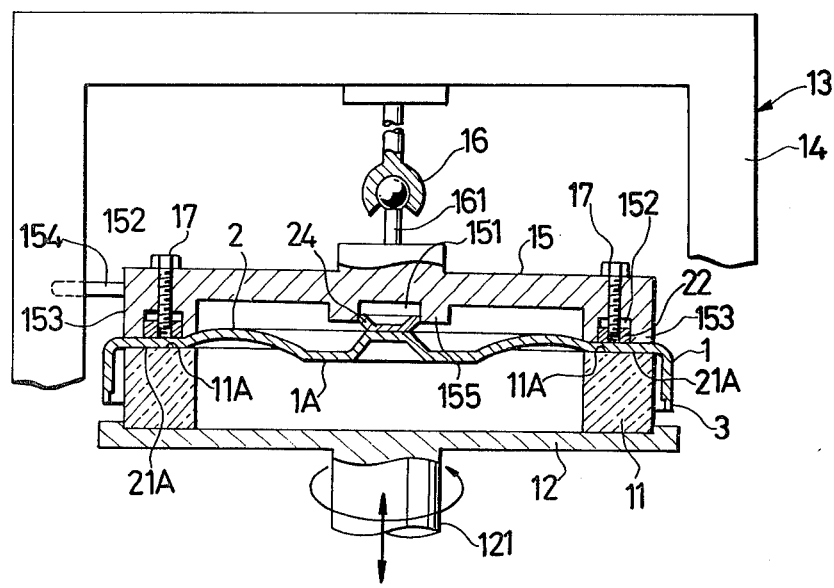
FIG. 2 is a schematic illustration, in section, of an embodiment of the apparatus suitable for carrying out the method of processing the friction surface of a front cover according to the present invention.

FIG. 2 shows a method and an apparatus for grinding the friction surface 21 formed on the inside surface of the press-formed front cover into a flat surface.

In FIG. 2, reference numeral 1A designates a front cover which has been formed by press-forming and has not yet been subjected to finishing and reference numeral 21A designates a friction surface having irregularity on the surface thereof due to spring-back effect developed after the press-forming.

A center guide 24 and mounting seats 22 are welded to the front cover 1A. The front cover 1A is fixed to a supporting table 15 by means of bolts screwed in the threaded holes formed on the mounting seats 2. The supporting table 15 is formed in the shape of a disk having an outside diameter substantially equal to that of the front cover 1A and is provided with annular walls 153 and 155 on the periphery and the central part thereof respectively. The mounting seats 22 and the center guide 24 are received in a plurality of holes 152 formed on the annular wall 153 and in a circular hole 151 formed on the annular wall 155 respectively.

The supporting table 15 is floatingly supported on a frame 14 by means of a stud 161 which is fixed to the supporting table at the center thereof at the lower end and is connected to the frame 14 by means of a ball joint 16 at the upper end. The frame 14 and the supporting table 15 consist a supporting device 13 for supporting the front cover 1A. The rotation of the supporting table 15 about its own vertical axis is impeded by the engagement of a rod 154 with the frame 14.

A rotary table 12 having the axis of rotation aligned with the vertical axis including the center of rotation of the ball joint 16 is disposed so as to rotate on a shaft 121. The shaft 121 is reciprocated in vertical directions by means of a drive unit, not shown. An annular grinding stone 11 is fixed to the rotary table 12 coaxially with the axis of rotation of the rotary table 12. The working surface 11A defining the upper surface of the grinding stone 11 is formed in a plane perpendicular to the axis of rotation of the rotary table 12. The dimensions and the area of the working surface 11A are the same with the final dimensions and the final area of the finished friction surface 21.

As the rotary table 12 is turned about its axis of rotation at a predetermined revolving rate and is raised by means of the shaft 121 to a front cover 1A affixed to the supporting table 15, the irregular protrusions formed on the friction surface 21A come in contact with and are ground by the working surface 11A of the grinding stone 11 successively from greater ones to smaller ones. In this grinding process, since the supporting table 15, thereby the front cover 1A, is floatingly supported by the frame 14 through the ball joint 16, the friction surface 21A of the front cover 1A is free to tilt with respect to the working surface 11A of the grinding stone 11 so that the irregular protrusions formed on the friction surface 21A are ground successively from the greater ones. As the greater protrusions are ground off, the contact area between the friction surface 21A of the front cover 1A and the working surface 11A of the grinding stone 11 increases so that the torque for turning the shaft 121 is required to be increased. Accordingly, the torque required for turning the shaft 121 is monitored continuously and when the torque has become as large as a predetermined value, the rotation of the rotary table 12 is stopped, the shaft 121 is lowered and the bolts 17 are removed to take out the finished front cover 1 from the supporting table 15. Thus the friction surface 21 is ground in a plane of a high flatness with the minimum grinding depth and in a short time.

Figure 3:
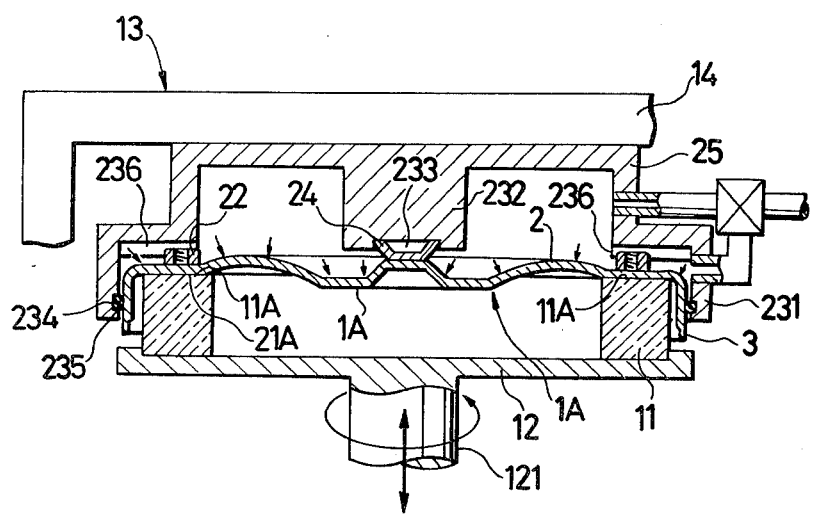
FIG. 3 is a schematic illustration, in section, of another embodiment of the apparatus for carrying out the method of processing the friction surface of a front cover according to the present invention.

FIG. 3 shows another embodiment of the apparatus for carrying out the method of the present invention. In this embodiment, a supporting table 25 having an outer cylinder 231 of an inside diameter substantially equal to the outside diameter of the peripheral portion 3 of the front cover 1A and an inner cylinder 232 provided with a circular hole 233 for receiving the center guide 24 welded to the front cover 1A is fixed to a frame 14. A circular groove 234 is engraved on the inner wall of the outer cylinder 231. An O-ring is fitted in the circular groove 234. A press-formed and not yet finished front cover 1A is slidably inserted into the outer cylinder 231 with the inner wall of the outer cylinder 231 and the peripheral portion 3 in liquid-tight engagement by means of the O-ring 235.

When the grinding stone 11 is raised by the shaft 121 with the rotary table 12 turning and the working surface 11A of the grinding stone 11 is pressed against the friction surface 21A of the front cover 1A, the center guide 24 of the front cover 1A is pushed into the circular hole 233 formed in the inner cylinder 232. Then a pressure is applied to the front wall portion 2 of the front cover 1A by supplying pressurized fluid into a chamber formed between the outer cylinder 231 and the inner cylinder 232 whereby the friction surface 21A is pressed against the working surface 11A of the grinding stone 11 to grind the irregular protrusions formed on the friction surface 21A. When greater protrusions formed on the friction surface 21A come in contact with the working surface 11A, the front cover 1A is tilted since the front cover 1A is pressed floatingly against the working surface 11A by means of the pressurized fluid, however, the tilting of the front cover is limited within a range allowed by the resiliency of the O-ring 235. Since the friction surface 21A and the working surface 11A are kept in contact by the pressure applied by the pressurized fluid, the contact pressure between the friction surface 21A and the working surface 11A is uniform. In the manner as described hereinbefore regarding the previous embodiment, the rotation of the shaft 121 is stopped when the torque required for turning the shaft 121 become a predetermined value, the pressurized fluid is drained from the chamber and the shaft 121 is lowered, then the finished front cover 1 is taken out. Projections 236 engaging with the mounting seats 22 welded to the front cover 1A and protruding into the chamber impede the rotation of the front cover 1A about its own vertical axis during the grinding process.

It is noted that the present invention may be embodied in the practical application thereof, by supporting the grinding stone floatingly and by fixing a front cover on a rotary table so that the front cover can be turned with respect to the grinding stone.

It will thus be seen that the objects set forth above, among those made apparent from the preceeding description, are efficiently attained and, as this invention may be embodied in several forms without departing from the spirit and the scope of the invention, it is intended that all matter contained in the above description or shown in accompanying drawings shall be interpreted illustrative and not in a limiting sense.

It is also to be understood that the appended claims are intended to cover all of the generic and the specific features of the invention herein described and all statements of the scope of the invention which, as a matter of language, might be said to fall therebetween.

What is claimed is:

1. A method of processing a front cover for a torque converter, comprising steps of;

press-forming, from a single metal plate, a drum-shaped front cover integrally comprising a front wall portion having a frictional surface, a cylindrical peripheral portion and a connecting portion connecting said front wall portion and said peripheral portion welding seats to said front wall of said front cover;

mounting said press formed front cover to a supporting table by disposing said seats and a center guide on said cover within recesses of the supporting table, said cover being further mounted in said supporting table so that a part of said connecting portion remains unsupported by said supporting table;

floatingly supporting said supporting table and said cover mounted thereon in a supporting device; and grinding said friction surface formed on the inside surface of said press-formed front cover by pressing an annular working surface of a grinding stone against said friction surface formed on the inside surface of said front cover under the relative rotation of said front cover and said grinding stone.

2. A method of processing a front cover for a torque converter according to claim 1, wherein said step of grinding comprises floatingly supporting said supporting table by means of a ball joint.

3. A method of processing a front cover for a torque converter according to claim 1, wherein said step of grinding comprises floatingly supporting said press-formed front cover at the periphery thereof within an outer cylinder of said supporting device and pressing the friction surface of said front cover against said working surface of said grinding stone by supplying a pressurized fluid into a chamber formed by the liquid-tight engagement between the inside wall of said outer cylinder and the periphery of said front cover.

* * * * *